UNITED STATES PATENT OFFICE 2,149,859

VULCANIZATION ACCELERATOR

Charles O. Miserentino, Buffalo, N. Y., assignor to Dunlop Tire and Rubber Corporation, Buffalo, N. Y., a corporation of New York No Drawing. Application May 15, 1937, Serial No. 142,876

18 Claims. (Cl. 260—270)

This application is a continuation in part of my co-pending application Serial No. 41,379 filed September 20, 1935.

My present invention relates to an accelerator of vulcanization, more particularly to an accelerator that will enable vulcanization to be accomplished at a relatively low temperature as, for example, at the temperature of boiling water.

More particularly the invention relates to an accelerator for use in making cellular rubber by a process of foaming an aqueous dispersion of rubber and thereafter vulcanizing the foamed structure.

Heretofore, ultra-accelerators have been used in vulcanizing such foamed rubber structures because vulcanization is preferably accomplished at the boiling point of water, generally in contact with boiling water or steam. Many of the ultra-accelerators are not sufficiently rapid to accomplish the vulcanization of the foamed structure at the low temperatures used.

Some ultra-accelerators that might be used at the temperatures desirable for the vulcanizing of a rubber foam have a tendency to break down the foam or froth of the aqueous dispersion while it is being formed, or while it is being set or gelled and thus impair or change the structure before vulcanization is possible. In many cases the presence of the accelerators heretofore available will prevent the formation of the froth or foam.

My present invention overcomes the above disadvantages and provides an accelerator which will rapidly cure the rubber froth or foam at a sufficiently low temperature such, for example, as the temperature of boiling water, and which will not impair or destroy the structure of the foamed latex.

The accelerator of my invention is a reaction product of a secondary amine and mono-basic organic acid and carbon bisulphide or, a salt of such reaction product with a metal. The reaction product has the general formula—

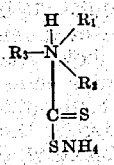

In the above formula $R_1$ and $R_2$ are organic radicals or may constitute different carbon atoms of an organic radical, and $R_3$ is the monobasic organic acid minus the hydrogen displaced when the acid combines with a base. The $NH_4$ radical may be substituted by any suitable metal such as zinc, sodium, magnesium, calcium, etc. The mono-basic acid in the above compound may be an aliphatic or an aromatic acid. For example, it may be a straight chain aliphatic acid such as oleic, stearic, palmitic, capric, caproic, acetic, lauric etc., acids, or it may be an aromatic acid such as benzoic acid or mercaptobenzothiazole (captax). Such acids as cinnamic acid, or other aromatic acids having a side chain might be used.

Any suitable secondary amine may be employed to give the radical—

For example, it may be a secondary aliphatic amine such as dimethyl amine, diethyl amine, dipropyl amine or a methyl-ethyl amine, methylpropyl amine, ethylpropyl amine, etc., or it may be a secondary aromatic amine such as diphenyl amine, or it may be a heterocyclic amine, or any amine in which two valences of the nitrogen atom are specified or taken up by one or two organic compounds.

For example, it may be piperidine—

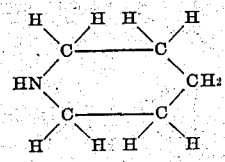

In forming the compound of my invention the mono-basic acid is combined with the secondary amine in a manner analogous to the formation of ammonium chloride from ammonia and hydrochloric acid, the valence of the nitrogen atom changing from 3 to 5. Then the compound thus formed is mixed with carbon bisulphide, whereupon the carbon atom of the carbon bisulphide displaces one of the hydrogen atoms combined with the nitrogen atom so that the carbon and nitrogen are directly combined, and the displaced hydrogen then combined with one of the sulphur atoms of the carbon bisulphide group. Ammonia added to the resulting compound combines with the hydrogen and sulphur of the compound. This ammonia may be replaced with any suitable metal such as zinc, calcium, magnesium, sodium, potassium, etc.

Example I

The following is an example of a preferred method of forming the accelerator of my invention. 10 grams of diethyl amine are dissolved in 240 grams of water and 40 grams of oleic acid added to the solution. The mixture is stirred until the oleic acid dissolves. This will require about fifteen minutes. The reaction between the diethyl amine and the oleic acid may be represented by the following equation:

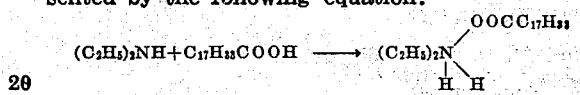

10.4 grams of carbon bisulphide are then added and the mixture stirred for an additional fifteen minutes. The reaction may be represented as follows:

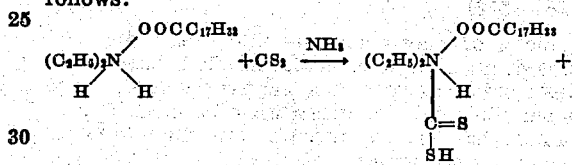

The resulting solution contains the accelerator and may be incorporated in an aqueous dispersion to be foamed and vulcanized to a permanent cellular structure. For example, the solution may be added to the aqueous rubber dispersion in the proportion of 20 grams of the solution for each 100 grams of dry rubber content in the dispersion.

Other straight chain organic acids may be substituted for oleic acid in whole or in part merely by using a weight of the acid having the same relation to the quantity of oleic acid as the relation of their molecular weight, it being understood that when acids of lower molecular weight are employed, a proportionately lower

weight may be used when substituted for oleic acid.

It will also be understood that diethyl amine has been mentioned merely by way of example of a secondary amine useful in the process, but it will be understood that other secondary amines, such as dimethyl amine or dipropyl amine might be used in place of diethyl amine. To form the corresponding metal salt, it is merely necessary to add zinc chloride or other salt, or to add a suitable hydroxide such as sodium or potassium hydroxide.

Example II

Diphenyl amine may be combined with stearic acid according to the following equation:

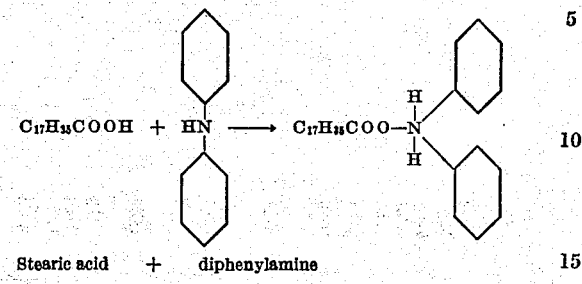

Stearic acid + diphenylamine

The combined proportions will be determined by the molecular weight as, for example, 284 parts of stearic acid to about 169 parts of the diphenyl amine. The resulting compound is then reacted with one molecule of carbon bisulphide (76 parts.)

Example III

Piperidine, a heterocyclic secondary amine, is

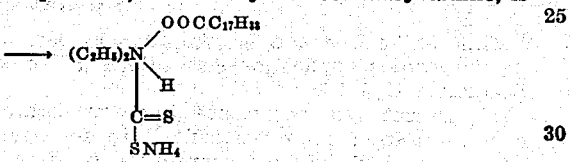

combined with stearic acid according to the following equation:

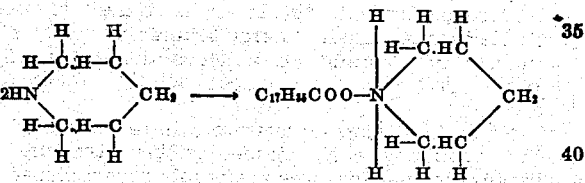

The combined weights may be calculated from the molecular formulae, for example, 85 parts of piperidine to 284 parts of stearic acid. The resulting compound may then be reacted with 76 parts of carbon bisulphide and with ammonia, or the hydroxides of zinc, magnesium, potassium, calcium, sodium, etc.

Example IV

An aromatic mono-basic acid, mercaptobenzothiazole, may be combined with a secondary amine according to the following equation:

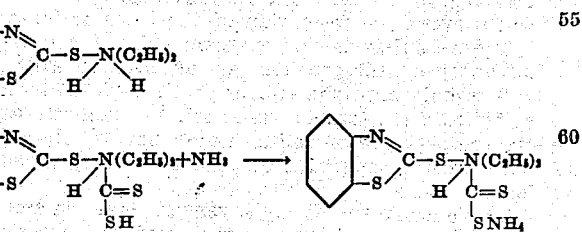

That is, in the proportions of 167 parts of mercaptobenzothiazole to 83 parts of diethyl amine. The resulting compound may then be combined with carbon bisulphide (76 parts), and then with any suitable metal or ammonium.

In each of the above reactions the carbon of the carbon bisulphide combines with the nitrogen atom of the compound resulting from the reactions represented by the equations. For example, diphenyl, dimethyl, dipropyl, etc., amines may be substituted in the reaction with the mercaptobenzothiazole, or a heterocyclic amine such as piperidine may be used in this reaction.

Similarly, the heterocyclic amine, such as piperidine, may be combined with other acids than stearic as, for example, palmitic, oleic, benzoic, cinnamic or mercaptobenzothiazole. Other heterocyclic amines may be employed instead of the piperidine as, for example, pyrrol.

While these various compounds may be employed, the simpler compounds are quite satisfactory and may be more pleasant to work with and are, therefore, preferred.

Through my invention, therefore, I have provided a large number of accelerators suitable for low temperature vulcanization and having properties particularly desirable in the production of foamed latex compounds. They may, however, be employed in various rubber compositions where vulcanization at low temperatures, or moderate temperatures, such as that of boiling water, or somewhat above, is desired. In such cases, the accelerator may be admixed with the rubber preferably in the form of latex or an aqueous dispersion and, upon gelling or setting, vulcanization may be accomplished by heating in boiling water or in steam, or in any suitable medium at the vulcanization temperature.

What I claim is—

1. The compound

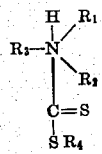

in which $$\frac{R_1}{R_2}$$

is an organic group having two carbon atoms separately joined to the nitrogen atom to form a secondary amine, in which $R_3$ is a mono-basic organic acid radical, and $R_4$ is a member of the group consisting of the metals usually used in rubber, hydrogen and ammonium.

2. The compound of claim 1 in which

is piperidine.

3. The compound of claim 1 in which

is a heterocyclic nitrogen compound.

4. The compound of claim 1 in which

is a secondary aromatic amine.

5. The compound of claim 1 in which

is a secondary aliphatic amine.

6. The compound of claim 1 in which

is a secondary amine of different organic radicals.

7. The compound of claim 1 in which

is diphenyl amine.

8. The compound of claim 1 in which $R_3$ is an aromatic acid radical.

9. The compound of claim 1 in which $R_3$ is mercaptobenzothiazole.

10. The compound of claim 1 in which $R_3$ is an aliphatic acid radical.

11. The compound of claim 1 in which $R_4$ is zinc.

12. The compound of claim 1 in which

is an aliphatic secondary amine and $R_3$ is mercaptobenzothiazole.

13. The compound of claim 1 in which

is piperidine, and $R_3$ is a radical of a higher fatty acid.

14. The process of making a vulcanization accelerator which comprises reacting a mono-basic organic acid with a secondary amine, and then reacting the resulting reaction compound with carbon bisulphide.

15. The process of making a vulcanization accelerator which comprises reacting a mono-basic organic acid with a secondary aromatic amine, and then reacting the resulting reaction compound with carbon bisulphide.

16. The process of making a vulcanization accelerator which comprises reacting a mono-basic aromatic organic acid with a secondary amine, and then reacting the resulting reaction compound with carbon bisulphide.

17. The process of making a vulcanization accelerator which comprises reacting a mono-basic organic acid with a secondary aliphatic amine, and then reacting the resulting reaction compound with carbon bisulphide.

18. The process of making a vulcanization accelerator which comprises reacting a mono-basic aliphatic organic acid with a secondary amine, and then reacting the resulting reaction compound with carbon bisulphide.

CHARLES O. MISERENTINO.